Figure 1A:
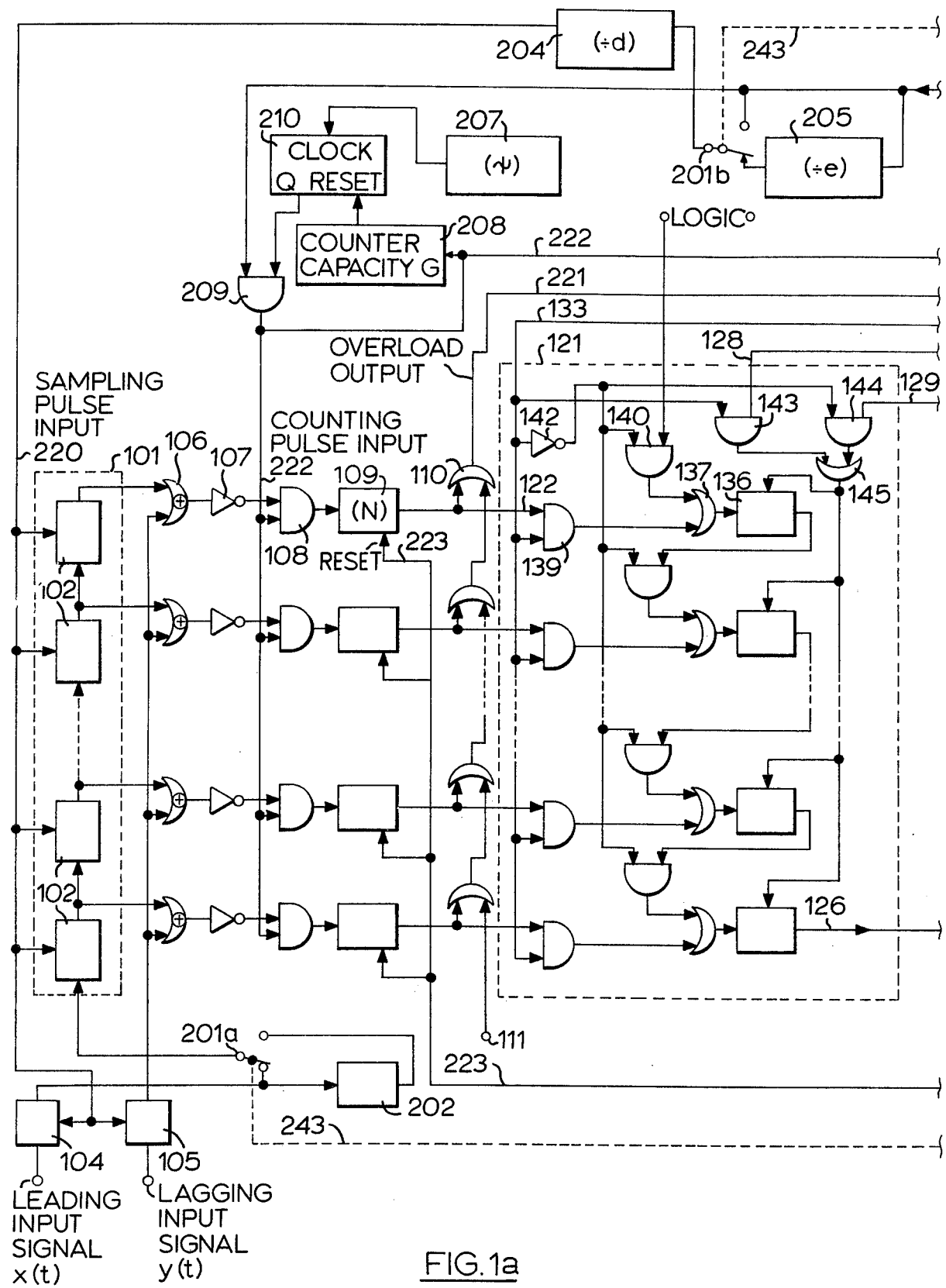

United States Patent [19]

Freeman et al.

[11] 4,097,801

[45] Jun. 27, 1978

[54] CROSS-CORRELATOR CIRCUIT

[75] Inventors: David Lewis Freeman, Bridgenorth; Ralph Seymour Flemons, Peterborough, both of Canada

[73] Assignee: Canadian General Electric Company Limited, Toronto, Canada

[21] Appl. No.: 777,769

[22] Filed: Mar. 15, 1977

[30] Foreign Application Priority Data

Apr. 1, 1976 Canada .................................. 249394

[51] Int. Cl.² ............................................. G04F 8/00
[52] U.S. Cl. ................................. 324/188; 324/77 H; 324/77 G
[58] Field of Search .................. 356/29; 324/181, 188, 324/77 G, 77 H, 77 D

[56] References Cited

U.S. PATENT DOCUMENTS

| 3,609,683 | 9/1971 | Hoffman | 324/77 H |
| 3,906,213 | 9/1975 | Meriaux | 324/77 H |

*Primary Examiner*—M. Tokar
*Attorney, Agent, or Firm*—Raymond A. Eckersley

[57] ABSTRACT

In a system for measuring the time delay existing between two pattern related random signals of similar but not identical modulated characteristics, utilizing the techniques of cross correlation, two analogue input signals are digitally quantized into binary form according to signal polarity. The first or leading quantized signal is delayed by a series of sequential time intervals or sampling periods to provide a time controlled sequence of delayed leading-signals at equal intervals. These delayed leading-signals are compared by a multiplication technique with the quantized second or lagging-signal, the occurrence when the signals correspond being summed in a series of overflow counters. The rate of filling of the responsive counters is proportional to the respective degree of correspondence and leads to one counter overflowing first, being indicative of the most probable time delay between the two signals. A variable frequency oscillator is used to control the sampling period so that overflow takes place most often in a selected one of the series of counters. To improve the time delay resolution, and to utilize higher frequency components of the signals, once a definite indication of cross correlation is achieved, the sampling period is reduced to a chosen fraction, such as one fifth, and increasing the number of time delay intervals imposed on the leading signal by the corresponding integral multiple, namely five to maintain the overflow in the same selected counter. The two mode operation described permits enhanced precision of time delay determination with economy of components. The readout for the system is derived from the oscillator frequency. The system is suitable for use with an ultrasonic velocity meter for measuring liquid flow in a pipe.

9 Claims, 3 Drawing Figures

CROSS-CORRELATOR CIRCUIT

This invention relates to a system for determining the time relationship between two signals by means of cross-correlation analysis, and in particular provides a cross-correlation apparatus suitable for use with a fluid flowmeter.

Considerable use has been made and is being made of systems embodying cross correlation techniques for determining the time delay relationship between succeeding related signals modulated to a corresponding but not identical pattern. One practical use of such a cross-correlation technique has been to measure the velocity of flow of a liquid through a pipe between a pair of spaced-apart stations transmitting ultrasonic signals diametrally across the pipe, as shown in British Specification No. 1,398,381 June 18, 1975 Gritten et al. Modulation of the transmitted signals is effected by flow disturbance patterns which travel with the flow. Thus the signal modulation sensed at the downstream station may well have a characteristic similarity to that previously received at the upstream station, without however being identical, since significant values of unrelated signals are inescapable. Known techniques of cross-correlation are used by applying determinable time delays to the modulated signal from the upstream station, comparing by multiplication with the downstream signal and averaging to establish the degree of correlation between the signals. When maximum correlation is observed it is indicative that the delay time period which produces such correlation represents the time of passage of a flow disturbance between the upstream and the downstream station, and thereby represents a reciprocal function of the flow velocity in the pipe.

In some prior systems, the predominant practice has been to delay the leading signal by a number of fixed time delay intervals and to infer the characteristic delay between the leading and lagging signals by noting the delay interval at which the greatest degree of correspondence exists between the signals. The possible accuracy in determining the characteristic delay is limited by the discrete nature of the delay intervals, so that if the delay to be determined is near the minimum measurable, the leading signal is delayed by only a few intervals and the achievable accuracy is poor. For example, a range of actual delay times lying between 4.5 and 5.5 delay intervals will all indicate maximum correspondence at 5 delay intervals, causing a 20% uncertainty in the inferred delay time. For flowmeter applications the required readout is in terms of flow per unit time which is inversely proportional to delay time. Hence a system in which the output is determined in terms of the number of fixed delay intervals, requires an additional operation to compute the reciprocal, an undersirable complication.

If the delay interval is made variable and the number of intervals is fixed, as in the present invention, the readout can be derived from the frequency of the oscillator which generates the variable delay interval, which frequency is directly proportional to the flow per unit time, avoiding the reciprocal computation. In other prior systems in which a variable time delay interval is used, a limited number (for example 3) of delayed versions of the leading signal are compared to determine the sign of the error between the actual characteristic delay of the signals and that indciated by the existing time delay interval. Limiting the number of delayed versions reduces the cost of the circuitry required but restricts the amount of information available to correct errors in the indicated time interval, leading to longer response time and greater statistical scatter in the measurement.

The present invention by utilizing digital large-scale integrated-circuits, previously designed by others for the realization of a cross-correlation analyser having fixed time delay intervals, in a manner which allows operation with variable time delay and simultaneous calculation of the cross-correlation function at many time delay intervals having a small incremental differences (for example 1 in 160), provides in an economical instrument the benefits of fast response, minimum statistical scatter, a constant and negligibly small measurement uncertainty throughout its flow range, and a frequency output which is a direct analogue of flow velocity per unit time.

In accordance with the present invention there is provided a cross-correlation system operating on analogue input signals digitally quantized by first generating from the signals corresponding binary signals the state of which changes with a change in polarity of the corresponding analogue signals, having a variable frequency oscillator which determines the instant at which the binary signals are sampled and the duration of discrete time delay intervals applied to the signal received from an upstream station, and a series of multipliers and counters operating on the series of delayed upstream signals together with the non-delayed sampled signal from a downstreamstation, such that a condition of maximum correspondence between the pairs of delayed and non-delayed signals is indicated by the overflow of one of the series of counters, and a feedback system connected in controlling relationship with the oscillator to vary the sampling and time delay intervals such that the overflow indications is made to occur on the average in a chosen one of the counters, which means to select alternative modes of operation based on the degree of such correspondence, whereby in a coarse mode the provided series of multipliers and counters covers a wide range of time delay intervals and in a fine mode the same series of multipliers and counters covers a more restricted range of delay intervals with a corresponding reduction of the sampling interval and consequent increase of the sampling frequency. Means are provided to maintain the time required to determine the degree of correspondence substantially constant and independent of the variable sampling time.

The selection of digitally quantized signals reduced to binary state signals represents optimum simplification at the input or sensing end of the apparatus, but is referred to generically as quantizing.

In a cross correlator as incorporate in the present system the cross-correlation function is defined mathematically by the expression $$R_{xy}(\tau) = \lim_{T \to \infty} \frac{1}{T} \int_0^T x(t - \tau) y(t) \, dt$$

where
$R_{xy}(\tau)$ is the correlation function,
$x$ and $y$ are the two signals being analyzed
$T$ is the time interval of the analysis and
$\tau$ is the delay time imposed on signal $x$ to achieve correlation.

With $x$ and $y$ being random noise signals, that are related because some of the noise components of $y$ appeared in $x$ at a time $\tau_d$ earlier, $R_{xy}(\tau)$ will have a maximum value when $\tau = \tau_d$. The magnitude of $R_{xy}(\tau)$ for other values of $\tau$ has significance for the determination of the frequency and phase relationships between the components of $x$ and $y$, but for the purpose of measuring $\tau_d$, only the maximum of the function is of interest. With this restriction, certain simplifications can be made in computing the function with the aim of reducing the complexity of the apparatus while still maintaining an adequate accuracy in the determination of $\tau_d$ and providing an ability to follow sudden changes in its value which occur in practice.

In carrying out cross-correlation it is known that two analogue input signals, $x(t)$ and $y(t)$ may be digitally quantized into binary form by determining their polarity, which technique does not reside in the present invention.

In the present invention, the quantized $x(t)$ signal is delayed in an R stage serial-in parallel-out shift register by a number of discrete time intervals, each of size $\Delta t$. At the rth output of the shift register the signal appears as $x(t - r\cdot\Delta t)$, where r represents the ordinal number of the output under consideration. The time intervals $\Delta t$ are controlled by a sampling pulse generator whose frequency can be varied, consequently varying $\Delta t$. The R outputs of the register are each associated with a simple binary multiplier which compares the register output with the quantized $y(t)$ signal during each time interval $\Delta t$, and provides a logic 1 output during which $\Delta t$ when $x(t - r\cdot\Delta t)$ and $y(t)$ are in the same logic state. Each of the R multipliers is connected to a digital counter having a capacity of N counts, which counts pulses from an averaging clock during those sampling intervals when the output of the associated multiplier is in the logic 1 state.

The probability, $P_r$, that the output of the rth multiplier is in the logic 1 state during any sampling interval depends upon the relationship between its two binary input signals, which comprise the quantized versions of $y(t)$ and $x(t - r\cdot\Delta t)$. If these two signals are randomly related, $P_r = 0.5$. If they are identical (perfectly cross-correlated, $P_r = 1$. When the two signals are related by a time delay $\tau_d$, the probability of correspondence is a maximum for that multiplier $r_m$ for which $\tau_d = r_m\cdot\Delta t$ and will be designated, $P_m$.

The time required for the rth counter to be filled to capacity if $N/\psi P_r$ where $\psi$ is the pulse rate of the averaging clock. This time-to-fill function is independent of $\Delta t$ but can vary over a 2:1 range depending upon the value of $P_r$.

If all counters are reset to zero, the one associated with the multiplier $r_m$, having $P_m$, the maximum value of $P_r$, will fill first and will represent the location of the peak of the cross-correlation pattern. The ordinal position, $r_m$ of this counter is noted and the time delay is determined as $\tau_d = r_m\cdot\Delta t$.

The number of pulses of the averaging pulse generator required to fill the counter at position $r_m$ can be compared with the capacity N of the counter, to determine $P_m$ for the correlation peak. The magnitude of $P_m$ is used to indicate to the operator the suitability of the signals $x$ and $y$ for his measurement purposes. It is also used to automatically control the operating mode of the correlator and, at times, to reject unsuitable signals, as will be explained.

Correlators in which the leading signal $x(t)$ is delayed by a number of fixed time intervals $\Delta t$ cannot determine the time delay $\tau$ to a greater precision than $\pm \Delta t$. Since $\tau$ is measured as $n\ \Delta t$ the possible error in $$\tau \text{ is } \pm \frac{\Delta t}{n \cdot \Delta t} \times 100\% = \pm \frac{100}{n}\%.$$

When $\tau$ and hence $n$ is small, this error can be inadmissibly large. To overcome this problem, the present invention, using the relationship $\tau_d = r_m\cdot\Delta t$, varies $\Delta t$ to bring the correlation peak to a chosen position $r_c$ in the total register R where $r_c >> 1$. This is accomplished by periodically determining the identity of the overflowing counter $r_m$, computing the magnitude and sign of the error function $r_c - r_m$, integrating this error function for form a control signal for the sampling pulse generator which controls $\Delta t$, so that when the average of $r_c - r_m$ is zero, $\Delta t$ is maintained constant.

That is to say, value of time delay $\Delta t$ is adjusted to bring the maximum of the function $R_{xy}(\tau_d)$ into coincidence with a predetermined counter $r_c$, whereat $r_c = r_m$. The value of frequency corresponding to the $\Delta t$ value at which $r_c - r_m = 0$ provides a continuous output directly proportional to a measured velocity or directly related variable.

To minimize the total number R of multipliers and associated counters and other circuit elements, while enabling $\Delta t$ to be short so as to utilize the high frequency components of the signals, a fine mode of operation is provided which becomes automatically operable when $r_c - r_m$ is less than a predetermined value and the average value of $P_m$ is sufficiently high. In this, the fine control mode, $\Delta t$ is reduced to a small fraction, such as 1/5, of its original value and the ordinal position $r_c$ of the multiplier chosen as the desired peak position is simultaneously increased by the corresponding multiple, such as 5 times its original value, so that the product of $\Delta t \cdot r_c$ remains constant. The change in ordinal position $r_c$ is obtained very simply by inserting before the input of the R stage serial-in parallel-out shift register a serial-in serial-out shift register having a suitable number of states [such as $(5-1)r_c$, if the multiple chosen is 5]. The relationship between $\Delta t$ and the frequency of the sampling pulse generator is also adjusted by the same factor (5 in this example) so that the frequency of the variable oscillator is not affected when the fine mode is adopted.

When operating in the "fine-mode" a large and very rapid change of value of time delay $\tau$ could exceed the rate at which $\Delta t$ can change to keep the peak position $r_m$ within the R stages equipped with multipliers and counters. If this happens the factor R for all R stages will decrease below the threshold level set for "fine-mode" operation. At such occurrence the coarse mode is reverted to, the serial-in serial-out shift register is switched out of circuit and $\Delta t$ is changed until $r_c - r_m$ is again less than the predetermined value and "fine-mode" operation automatically resumed.

An additional feature is optionally provided, which permits rejection of error correction determinations which arise from sequences of input signals having low correlateable content. It has been discovered that the presence of correlateable components in typical signals from certain flowmeter applications can vary widely in intervals of a few seconds. The present invention determines the probability factor $P_m$ for each cycle, i.e. a sequence of signals which fills one of the R counters. An optional circuit is provided which, if $P_m$ is below a selectable limit, will reject the computed error function $r_c - r_m$ for that cycle so as to avoid changing the oscillator frequency and thus to reduce statistical disturbances of $\Delta t$ due to random phenomena. This has been found to measurably reduce the statistical scatter in the determination of the time delay in certain applications.

Figure 1B:
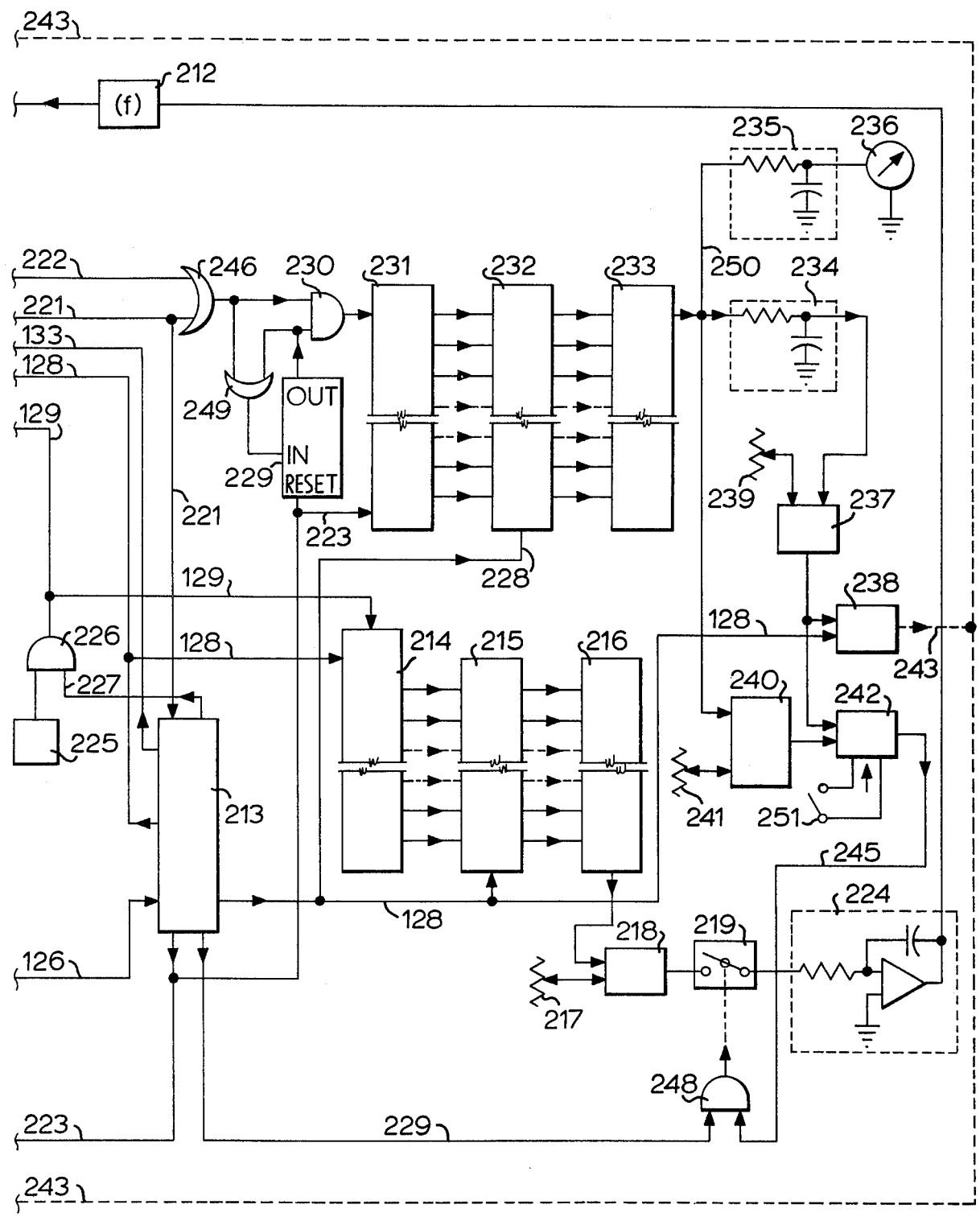
Figure 2:
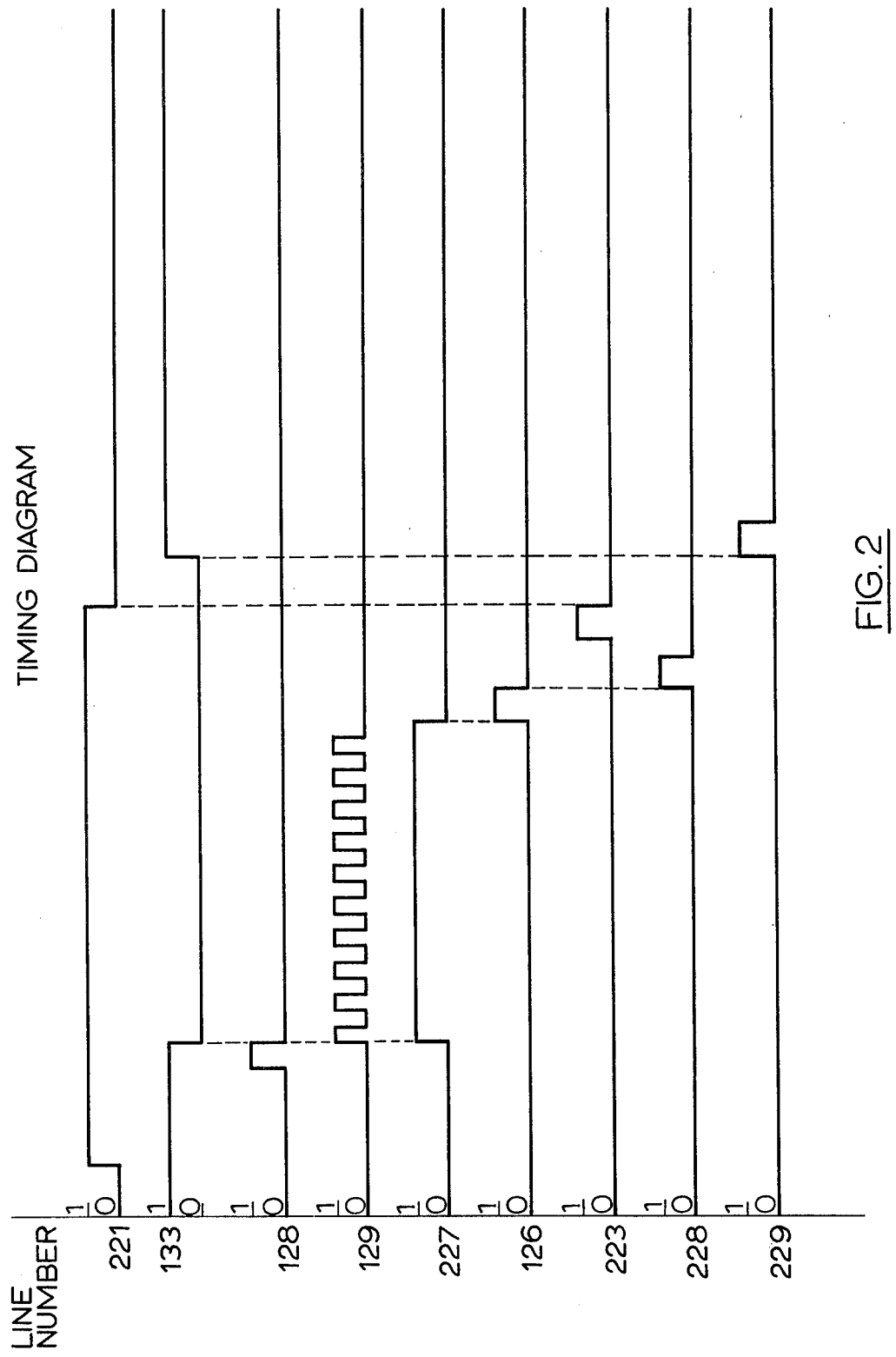

Certain embodiment of the invention are described, reference being made to the accompanying drawings, wherein;

FIG. 1 is a schematic arrangement of a process correlator in accordance with the present invention; and FIG. 2 is a timing diagram of the subject correlator giving indication of the respective signal logic levels, so as to clarify the interelationship of the pulses on the various lines.

To construct a correlator in accordance with the present disclosure it has been found feasible to utilize digital large-scale integrated circuits previously designed for carrying out a cross correlator system of others.

FIG. 1, comprising complementary FIGS. 1a and 1b schematically defines the circuit diagram, while in FIG. 2 there is illustrated the related signal levels appearing on the circuit conductors, being either a logic zero or a logic 1 condition.

The apparatus shown in FIG. 1 includes a binary shift register 101 consisting of a large number (R) of identical binary storage stages 102 connected in series. For convenience only the first, second, (R−1)th and Rth of the stages 102 are shown. Each stage 102 has a control terminal to which is applied, via line 220, a train of sampling pulses having a period of $\Delta t$ seconds, and is operative so that changes of state of its output (between logic 0 and logic 1 in either sense) occur only at the ends of these pulses, the state assumed by the output of the stage at the end of each pulse being the same as the state of the input of the stage at the beginning of that pulse, such a storage stage may for example conveniently be constituted by a master slave JK flip-flop.

The sampling pulses on line 220 are derived from the output of a variable frequency oscillator 212 of frequency $f$, by digital counters 204 and 205. Counter 204 produces one output pulse for each "$d$" input pulses (typically $d=400$) and counter 205 produces one output pulse for each "$e$" input pulses (typically $e=5$).

A switching means 201 is provided having two sections 201a and 201b which operate simultaneously under control of controller means 238 which will be described later. Switch 201b allows counter 205 to be selectively interposed between the oscillator 212 and counter 204, thus the sampling interval $\Delta t = d \cdot e / f$ seconds with switch 201b in the position shown or $\Delta t = d / f$ with switch 201b in the opposite position.

Two identical samplers 104 and 105 are provided which are operative under control of the sampling pulses from line 220 to provide binary output signals whose state will change at the end of a sampling pulse if the polarity of their input signal at the beginning of the sampling pulse is different from its polarity at the beginning of the previous sampling pulse. Samplers 104 and 105 may for example each consist of a simple polarity detector followed by a binary storage stage similar to stage 102. It will be that, if the sampling time-interval $\Delta t$ is sufficiently short, the outputs of samplers 104 and 105 will approximate to binary signals which change state whenever the polarity of their respective input signals change, and that the outputs of successive stages 102 of the register 101 will be in the form of increasingly delayed versions of the output of sampler 104.

The output of sampler 104 is applied to the input of the first of the stages 102 via switch 201a. With switch 201a in the position shown the value of the delay of the rth stage is equal to $r \cdot \Delta t$ where r represents the ordinal position of the stage in the register 101. With switch 201a in the opposite position to that shown, a "w" stage shift register 202 is interposed between the output of sampler 104 and the input of the first of the stages 102. Register 202, under control of the sampling pulses from line 220 which are applied to its shift input, delays the output signals from sampler 104 by w additional sampling periods so that r then represents the actual ordinal position plus 2, the number of stages in shift register 202.

Each stage 102 of the register 101 has associated with it a channel comprising an EXCLUSIVE OR gate 106, an inverter 107, and AND gate 108 and a pulse counter 109, all of the channels being identical. In each channel the output from the related stage 102 is connected to one input of the gate 106, and the output of sampler 105 is connected to the other input of gate 106. The output of gate 106 is applied to inverter 107, the output from which is applied to one input of gate 108. The other input of gate 108 is connected to a counting pulse line 222. The output of gate 108 is applied to the input of counter 109.

Each counter 109 has a counting capacity of N and is operative so that starting from a condition of zero count, its output will be in the logic 0 state until the end of the Nth pulse applied to its input, when the output will change to the logic 1 state and will remain in this state until the zero count condition is restored by the application of a logic 1 signal via line 223 to the reset input of the counter. The condition of the counter 109 when its output is in the logic 1 state will subsequently be referred to as the overload condition.

To meet the requirements of the available integrated circuits, the counting pulses on the line 222 are synchronized with the sampling interval by deriving them both from a common source, oscillator 212. This is accomplished by the provision of: a pulse generator 207 which produces pulses at a frequency $\psi$, a flip-flop 210 having a clock input fed from generator 207 a reset input and a Q output, and AND gate 209 having two inputs the first connected to the output of oscillator 212 and the second connected to the Q output of flip-flop 210 and having an output connected to line 222, and a counter 208 having an input connected to line 222 and an output at which one pulse appears for each g input pulses said output being connected to the reset input of flip flop 208.

This circuit will generate an approximately constant number of counting pulses per second although the frequency of the source oscillator 212 from which they are derived varies over a range exceeding 10:1. The circuit operates as follows: Assume the Q output of flip-flop 210 is in the logic 1 state, the output of gate 209 will be a train of pulses at frequency $f$. When g such pulse have appeared, counter 208 will reset the output of the flip-flop to logic 0 where it will remain until the occurrence of the next pulse from the averaging clock generator 207. Thus batches of g pulses at a pulse rate of $f$ per second are delivered to line 222 at an average rate of $g \cdot \psi$ (i.e. g times frequency of the generator 207) which rate is not dependent on $f$, the frequency of generator 212.

The action of the samplers, register, associated gates and counters in measuring the time delay of a correlation peak will now be described: During each interval $\Delta t$ defined by the sampling pulses, each gate 106 and inverter 107 combination feeds a logic 1 to the related AND gate 108 when there is a coincidence between the existing output state of sampler 105 and the output state of sampler 104, $r \cdot \Delta t$ seconds earlier in time. The probability of the existence of said coincidence in the rth stage may be expressed as $P_r$ which is a statistical function of the input signals $x(t)$ and $y(t)$ and of the time delay $r \cdot \Delta t$ incorporated in the quantized version of the signal $x(t-r \cdot \Delta t)$ which appears at the rth storage stage 102. If the signals have no correlatable content, $P_r$ will average 0.5 for all stages. If $y(t)=x(x-\tau)$, $P_r$ will equal 1 when $r \cdot \Delta t = \tau$. In practice $0.5 < P < 1$ in the region of the peak of the correlation function $R_{xy}(\tau)$ and $P_r$ max $|_o^R$ occurs when $r \cdot \Delta t = \tau$.

During each sampling interval when the said coincidence exists at the input to the rth gate 106, the associated counter 109 counts the pulses which appear on line 222 at a rate $g \cdot \psi$ per second. Hence the rth counter receives pulses at an average rate $P_r \cdot g \cdot \psi$, thus reaching its capacity N and attaining the overload condition in $N/P_r \cdot g \cdot \psi$ seconds. The first counter to overload will be that for which $P_r$ is the highest and its ordinal position $r_m$ indicates that the time delay of the correlation peak is $r_m 1 \Delta t$ seconds. The degree of correlatability of the input signals is indicated by the magnitude of $P_m$. (The subscript $m$ represents the channel whose counter overflows first). This is assessed by determining the number of pulses on line 222 in excess of N, which were required to cause said counter to overflow. The circuit provided to make this determination will be described later.

The method used to indicate that one of the counters 109 has reached the overload condition and to identify the ordinal position $r$ of that counter will now be described. It will be appreciated that the particular method illustrated is required because of the characteristics of the available integrated circuits and more direct methods could be used if this constraint were not imposed. The outputs of the counters 109 were respectively applied to a chain of OR gates 110, the second input of each OR gate 110 except the first in the chain having applied to it the output of the preceding gate 110 in the chain; the second input of the first gate 110 in the chain is connected to a terminal 110 to which a continuous logic 0 signal is applied. When one of the counters 109 attains the overload condition, its logic 1 output turns on its associated gate 110 which propagates through all the succeeding gates 110 above it in the chain causing a logic 1 to appear on line 221 indicating that one or more of the counters 109 has overloaded.

The apparatus further includes a pattern register 121 which is arranged to store temporarily the set of states of the outputs of the counters 109. The register 121 has R parallel input lines 122 which are the respective outputs of the counters 109. The register 121 further has a load pulse line 128, a shift pulse line 129 and a mode control line 133.

The register 121 comprises a set of R binary storage stages 136 similar to, and respectively corresponding to, the stages 102. Each stage 136 has associated with it an OR gate 137 and two AND gates 139 and 140. For each of the stages 136, the output of the associated OR gate 137 is applied to the input of the stage 136, and the output of the stage 136 is applied to one input of the AND gate 140 next in order below it in the chain. To the inputs of each OR gate 137 are respectively applied the outputs of the associated AND gates 139 and 140, one input of the gate 139 being connected to a corresponding one of the lines 122 and the other input of the gate 139 being connected to the line 133. The line 133 is also connected to the input of an inverter 142, the output of which is applied to one input of each of the gates 140. The second input of that gate 140 is associated with the last of the stages 136 is supplied with a continuous logic 0, while for each of the other gates 140 the second input has applied to it the output of that stage 136 next in order above the stage 136 with which that gate 140 is associated.

It will thus be seen that with a logic 1 signal applied to the line 133 the register is in the load mode and the outputs of the counters 109 will be respectively applied to the inputs of the stages 136. If one of the counters 109 is at that time in the overload condition, the application of a logic 1 load pulse to line 128 will cause the output of the corresponding stage 136 to assume a logic 1 condition. Accordingly the respective states of the outputs of the stages 136 at the end of a load pulse will correspond with the respective states of the outputs of the counters 109 at the beginning of that load pulse, so that the register 121 will store information concerning the position of any counters 109 which are in the overload condition.

Assume such an overload indication has been stored in the stage 136 in the rth position. At the end of the load pulse, line 133 returns to a logic 0 condition causing the register to assume the shift mode. After $r$ logic 1 shift pulses are applied to line 129, a logic 1 will appear on line 126. Thus the ordinal position of the overflow indication can be determined by counting the number of shift pulses required to cause the appearance of a logic 1 signal at output 126.

In correlation analysers built according to prior art, the ordinal position of the overload indication is used to determine the characteristic time delay $\tau$ of the correlation peak using the relationship $\tau = r_m \cdot \Delta t$ where $\Delta t$ is a fixed interval which may be preselected for a given application but is not dynamically varied. To enable $\tau$ to be determined without the limitations imposed by discrete steps of time delay, in the present invention $\Delta t$ is varied to hold $r_p$ constant by controlling the frequency of oscillator 212.

The frequency control is effected by a number of interconnected devices which will now be described: A sequence controller 213 is provided, having two inputs connected respectively to lines 221 and 126 and six outputs connected respectively to lines 133, 128, 223, 227, 228, and 229. Also provided are: An AND gate 226 having an output connected to line 129 and two inputs connected respectively to line 227 and to the output of generator 225 comprising a pulse generator which continuously generates a series of pulses, an AND gate 248 having a first input connected to an output of controller 213 by 229 and a second input connected to line 245, a counter 214 having a capacity of at least R counts with a first (counting) input connected to line 129 a second (reset) input connected to line 128 and multiple outputs which are connected to register 215, comprising a storage register 215 with multiple data inputs connected to the corresponding outputs of couner 214 a transfer input connected to line 228 and multiple outputs which are connected to converter 216 comprising a digital to analogue converter 216 with multiple data inputs connected to the corresponding outputs of register 215 and one voltage output, a summing unit 218 having two inputs the first connected to the output of converter 216 and the second connected to the output of means 217, a setpoint means 217 having an output which provides a selectable voltage of polarity opposite to the output of converter 216, a switching means 219 having a signal input connected to the output of unit 218 a control input connected to the output of gate 248 and a signal output, an integrating means 224 having an input connected to the signal output of means 219 and an output connected to the control input of voltage-controlled oscillator 212 which has been previously described.

The method by which this circuit causes the frequency of oscillator 212 to be a linear inverse function of time delay $\tau$ is as follows: Upon the appearance of a logic 1 signal on line 221, signalling the presence of an overload condition in one of the counters 109, the sequence controller 213 generates a series of pulses. A logic 1 is present on line 133 from the preceding cycle, placing the pattern register 121 in the load mode. Next a logic 1 appears on line 128, loading stages 136 and resetting counter 214. Line 128 then resumes logic 0 followed by line 133 returning to logic 0 followed by line 133 returning to logic 0, which places register 121 in the shift mode. Controller 213 next causes line 227 to assume logic 1, enabling gate 226 to pass shift pulses from generator 225 via line 129 to register 121 and to counter 214. When the logic overload pulse appears on line 126 it forms a second input to controller 213, causing it to remove the logic 1 from line 227 which causes gate 226 to block the shift pulses from counter 214 which thus registers a number $r_m$ representing the ordinal position of the counter 109 which overloaded. Controller 213 then causes a pulse to appear on line 228. The storage register 215 is cleared. At the end of the pulse the number $r_m$ in counter 214 is transferred to and stored in register 215. The digital to analogue converter 216 generates a voltage proportional to the value of $r_m$ which is fed to one input of summing unit 218. A voltage, equal in magnitude but opposite in polarity to the output of converter 216 when the number in register 215 is $r_c$, is generated by set point unit 217. ($r_c$ represents the chosen position of the correlation peak). The voltage output of unit 217 is fed to the second input of unit 218 which then provides an output voltage proportional to $r_m - r_c$. The pulse on line 126 also causes controller 213 to supply gate 248 with a pulse to close switch 219, provided a logic 1 exists on line 245. While switch 219 is closed current flows into or our of integrating means 224, the direction and magnitude of the current being determined by the algebraic difference $r_m - r_c$. Within means 224 the current serves to charge or discharge the storage capacitor, causing the output voltage to increase or decrease during each current-flow interval by an amount determined by the closeness of the position $r_m$ of the overflowing counter to the chosen position $r_c$. Since this output voltage is fed to oscillator 212 and controls its frequency $f$, which in turn controls the sampling period, and the overflow position at the end of the next cycle, since $r_m = \tau/\Delta t$. The polarity of the control voltage is chosen so that if $\tau$ remains constant the difference $r_m - r_c$ is reduced on each succeeding cycle in the manner known to the art as integral negative-feedback control. Controller 213 next applies a logic 1 to line 233 which resets all counters 109 to a zero count condition and causes them all to assume a logic 0 output, which subsequently appears on line 221. The counters 109 are now able to respond to pulses from gates 108 and a new cycle begins. Finally controller 213 restores the logic 1 on line 133 which returns register 121 to the load mode in preparation for the next overload of a counter 109.

The control sequence which has been described at length actually takes place in a short time compared to the time required to fill the counters 109. During this filling time the sampling interval $\Delta t$ remains constant, allowing a significant measurement of $\tau$ and $P_m$ to be made. If the time delay $\tau$ changes to a different value, $\Delta t$ will change in stepwise manner until the difference $r_m - r_c$ is again reduced to zero and the equality $r_m \cdot \Delta t = \tau$ is satisfied.

With switch 201$b$ in the position shown, $\Delta t = d \cdot e/f$ (as explained previously) and the frequency of oscillator 212 is $f = (d \cdot e/\Delta t) = d \cdot e \cdot r_c/\tau$. Thus $f$ is the required linear inverse function of $\tau$. When switch 201$b$ is in the opposite position to that shown, $\Delta t = d/f$. However switch 201$a$, which operates simultaneously with 201$b$, changes the effective value of $r_c$ to $r_c - w$ (where $w$ is the capacity of shift register 202). Since $w$, $e$ and $r_c$ are chosen to satisfy the relationship $r_c + w = e \cdot r_c$, the new relationship $f = d/\Delta t = d \cdot (r_c + w)/\tau$ is identical to $f = d \cdot e \cdot r_c/\tau$ and the frequency of oscillation $f$ required to place the overload at $r$ is the same for either position of switch 201.

It will be apparent to those skilled in the art that there are many other combinations of devices which could be substituted for devices 214, 215, 216, 217, 218, 219, 248 and 224 to cause the frequency of oscillator to be altered. The essential characteristic of means falling within the scope of the present invention are that the frequency of oscillator 212 should remain stable during each period while the counters 109 are counting and that the oscillator frequency should be changed before the start of the next counting period by an amount proportional to the magnitude and direction of the position of the overloading counting relative to a desired position in such a sense that the error in said position tends to be reduced.

In addition to determining the most probable time delay between the two signals $x(t)$ and $y(t)$, the present invention provides a measure of correlatable content in the input signals and uses this information in several ways. These features will now be described.

There is provided a counter 229 of capacity N which is similar to the counters 109 described previously. Counter 229 has a counting input which is connected to the output of OR gate 249 and a reset input which is connected to line 223. Also provided is an OR gate 246 having two inputs, one connected to line 222 and the other to line 221, an AND gate 230 having two inputs one connected to the output of counter 229 and the other to the input of gate 246. A counter 231 is provided having a capacity of at least N, a counting input connected to the output of gate 230, and multiple outputs which allow transfer of its accumulated count to the storage register 232. Counter 231 also has a reset input which is connected to line 223. A storage register 232 is provided which has multiple inputs connected to the corresponding outputs of counter 231, a control input which is connected to line 228 and multiple outputs. A digital to analogue converter is provided having multiple inputs which are connected to the corresponding outputs of register 232 and an output which forms line 250.

Low pass filter means 235 and voltage-indicator means 236 are provided. The input of means 235 is connected to line 250 and the output to means 236.

Also provided are low-pass filter means 234, comparator means 237 having two analogue inputs and a digital output, set point means 239 providing an adjustable output voltage and a mode controller 238 having two inputs and one output. The input of filter 234 is connected to line 250 and its output is connected to the first input of comparator 237. The second input of comparator 237 is connected to set point unit 239 and its output forms a first input to controller 238. The second input to controller 238 is connected to line 228 and its output to line 243.

Also provided are set point means 241 providing an adjustable output voltage, comparator means 240 having two analogue inputs the first connected to line 250 and the second to set point means 241. A "low $P_m$ reject" control means 242 is also provided having three inputs, the first being connected to the output of comparator 240, the second input being connected to the output of comparator 237 and the third input being connected to switching means 251. The output of means 242, is connected via line 245 to gate 248. Switching means 251 provides manual control of the "low gate $P_m$ reject" option.

The method by which these components are used to determine the correlatable content of the input signals is as follows: Counting pulses from line 222 are fed to counter 229 via OR gates 246 and 249 and to all counters 109 via AND gates 108. Following the reset of all counters 109 line 221 is at logic 0 and gate 246 passes the counting pulses from line 222 via OR gate 249 to counter 229 which fills after N pulses and provides a logic 1 input to gates 230 and 249. Gate 249 latches the output of counter 222 to logic 1. Gate 230 then passes the counting pulses present on its other input to counter 231. The counters 109 receive the counting pulses from line 222 via their gates 108 during each sampling interval when there is coincidence between the two inputs of the related exclusive OR gates 106 in the manner described previously.

If perfect coincidence exists between the said two inputs of the gate 106 associated with one of the counters 109, the counter will reach the overflow point, after N counting pulses, simultaneously with counter 229. The overflow of the counter 109 will cause a logic 1 to appear on line 221 as explained previously, which will cause OR gate 246 to interrupt the counting pulses before any are registered in counter 231. Thus if for any channel "$r$" the probability of coincidence $P_r$ is 1, no counts will accumulate in counter 231 and the voltage output of D to A converter 233 will be zero. If there is no correlation between the two inputs of any of the gates 106, all gates 108 will pass counting pulses to their related counters 109 one half of the time on the average. Thus the average counter will fill after 2N counting pulses, at which time counter 231 will have accumulated N counts, resulting in a maximum output voltage from converter 233. In practice, one of the counters 109 always overflows before 2N counting pulses have occurred so that the output of converter 233 is less than the maximum, tending toward zero if a high degree of correlation exists in the channel which overflows first. Thus at the end of each counting cycle a voltage level is established at the output of converter 233 which represents the degree of correlation present in the sequence of samples which caused the overflow. This voltage is retained until the completion of the next overflow cycle at which time it changes to represent the correlation of that cycle.

Transfer of the count accumulated in counter 231 to storage register 232 is controlled by the pulse from controller 213 which appears on line 228. Reset of counters 229 and 231 before the start of a new cycle is accomplished by the pulse from controller 213 which appears on line 223.

The sequence of voltage levels appearing at the output of converter 233 is used in three ways. It is applied to a low-pass filter 235 which has a time constant of several cycle times. The output of the filter is displayed on a meter 236 as an indication of the suitability of the signals for correlation flow metering.

The output of converter 233 is also used to automatically control the operating mode of the correlation analyzer. The output voltage is fed to integrating filter 234 whose output is the average value resulting from several counting cycles. This average is compared in device 237 with a set point from device 239 which has been chosen to represent a degree of correlation above which fine-mode operation of the analyzer is practical. When the voltage is greater than the set point a logic 0 output from comparator 237 is fed to mode controller 238, which via output 243, sets switches 201a and 201b to the position shown in FIG. 1, excluding shift register 202 and including counter 205 in the circuit. In this mode of operation, which is terms the coarse mode, the chosen position of the correlation peak or counter overflow is $r_c$, a number less than R (typically $r_c = 32$). The coarse mode is always assumed on start up and whenever the correlatable content of the signals becomes low.

When the average output voltage of converter 233 is less than the set point from device 241, a logic 1 from comparator 237 is fed to the mode controller 238 which sets switches 201a and 201b to their opposite position, excluding counter 205 and including register 202 in the circuit. In this, the fine mode of operation, the chosen counter overflow position is $r_c + w$ (typically 160) and the sampling period is reduced by the factor 1/5, where 3 is the capacity of of counter 205 (typically $e = 5$). Operation in this mode allows greater precision in the determination of time delay $\tau$ and allows utilization of higher frequency components of the input signals.

A strobing input to controller 238 from line 228 ensures that the position of switches 201 is altered only when counters 109 are not operating.

The output of converter 233 may also be used to reduce the statistical scatter in the measured value of time delay $\tau$ by the activation of the "low $P_m$ reject" option. For this purpose the output voltage of converter 233 is fed to one input of comparator 240 where it is compared with a set point voltage from device 241. When the output of converter 233 is higher than the set point, representing a cycle in which the date is poor, the output of comparator 240 is a logic 0 which is fed to controller 242, causing it to feed a logic 0 to line 245 providing that a logic 1 is present on that input of controller which is connected to the output of comparator 237 and that switch 249 is closed. The output of controller 242 which appears on line 245 forms one input of gate 248 which can block the pulses which actuate charge-transfer switch 219. If switch 249, which activates the "low $P_m$ reject" option is closed and a cycle occurs for which the correlatable content is low, the step adjustment of the frequency of osciallator is not made because switch 219 does not close. If a number of cycles having low correlatable content are received in succession, the average output of converter 233 will rise enough to cause a logic 0 at the output of comparator 237 which will disable the "low $P_m$ reject" option. Hence this option is sued only when the input date is suitable for operation in the fine mode.

What I claim as new and desire to secure by Letters Patent of the United States is:

1. A cross-correlation analyser comprising: quantizing means for quantizing a first random modulated signal and a second similarly modulated signal having an unknown lapsed time interval from said first signal; variable oscillator delay means for delaying said quantized first signal by a succession of equal time delay increments to provide a series of delayed quantized versions of said first signal in time overlapped relation with said second quantized signal; a plurality of first comparison means each receiving a respective said delayed first quantized signal of said series and said second quantized signal, to simultaneously compare individual ones of said first series of delayed quantized signals with said second quantized signal; a plurality of counting means each connected to a respective said comparison means, the individual average counting rate of said counting means being a measure of the degree of coincidence between the respective first and second quantized signals; signal overflow detection means for determining which said counting means has the highest rate; signal responsive servo means connecting said overflow means in controlling relation with said variable oscillator to adjust said oscillator delay increments in order to locate said highest counting rate at a predetermined one of said counting means, and oscillator read-out means to provide a function of said oscillator frequency as an inverse function of said lapsed time interval.

2. The analyser as claimed in claim 1 including a fine mode circuit with frequency multiplier, a related time shift register, second comparison means connected to said overflow detection means to compare said highest counting rate with a predetermined standard, control means connected to said second comparison means and responsive to said standard being exceeded to switch to said fine mode circuit, by connecting said frequency multiplier with the circuit of said variable oscillator to significantly diminish said time delay increments by a predetermined divisor, said related shift register being serially connected to introduce a corresponding compensating additional time delay to said quantized first signal to compensate for the reduction in elapsed time of said first series of delayed signals, so as to permit maintainance of said highest counting rate at said predetermined counting means, in response to adjustment by said oscillator servo means, whereby the sensitivity of the analyser in response to adjustment of said oscillator and the accuracy of said oscillator read-out means is correspondingly improved.

3. The analyser as claimed in claim 2 wherein said divisor has a value of five.

4. The analyser as claimed in claim 2, wherein said control means is responsive to said second comparison means, when operating in said fine mode to switch the analyser for operation in a coarse mode of operation upon said highest counting rate failing to achieve said predetermined standard.

5. The analyser as claimed in claim 2 including error detection means to identify the occurrence of first and second signals indicative of an absence of correlation therebetween, during a counting cycle of said overflow detection means, and signal rejection means responsive to an unduly low level of correlation, to discard said cycle and to permit retention of said analyser in operation with said fine mode circuit, whereby premature reversion to the normal operational mode is delayed.

6. An analyser as claimed in claim 2 wherein said comparison means provide determination of the ordinal position of said counting means having the highest counting rate, said second comparison means having signal diverting means connected thereto responsive to said counting rate below a predetermined value indicative of a low degree of correspondence between said quantized signals, to prevent an ordinal position error signal passing to error signal summation, whereby the occurrence of a said signal having a low probability of accuracy does not influence the mode of operation of said analyser.

7. An analyser as claimed in claim 4 wherein said comparison means provide determination of the ordinal position of said counting means having the highest counting rate, said second comparison means having signal diverting means connected thereto responsive to said counting rate below a predetermined value indicative of a low degree of correspondence between said quantized signals, to prevent an ordinal position error signal passing to error signal summation, whereby the occurrence of a said signal having a low probability of accuracy does not influence the mode of operation of said analyser.

8. The method of determining the inherent time delay between a leading incoming signal and a lagging incoming signal, comprising the steps of: generating a series of delayed versions of the leading incoming signal to provide a train of signals each delayed by a successive integer multiple of a time delay interval covering a range which includes said inherent delay; multiplying after each delay interval each said delayed signal with the real time lagging signal to provide an output series proportional to the respective degree of similiarity between said real signal and each said delayed signal, averaging the products of each multiplication during many delay intervals to provide a series of outputs each representing the degree of cross correlation existing between the lagging signal and the respective said delayed leading signal, comparing said outputs to indentify the output having the maximum average value, noting the integer number of time delay intervals producing said maximum average output, and varying the frequency of said time delay intervals provided by a generator to cause the number of time delay intervals required to produce the maximum average output to correspond to a predetermined number of delay intervals, wherein the frequency of said generator is an inverse function of said delay time, and a direct function of the transport velocity of the medium which caused the delay time between said leading and lagging signals.

9. The method as claimed in claim 8 wherein control of said generator is accomplished by: determining after each averaging process the magnitude and direction of the difference between the number of time delay intervals required to produce the maximum average output and said predetermined number of time delay intervals, adjusting the frequency of said generator stepwise by an amount corresponding to said difference thus changing the duration of the time-delay intervals, reaveraging the products of said multipliers to determine the number of new time-delay intervals required to produce the maximum average output, repeating the steps of adjusting and reaveraging continuously, whereby the frequency of said generator is the algebraic sum of all preceeding correction steps, to provide integral negative feedback control having zero offset error.

* * * * *